United States Patent [19] [11] 3,693,525
Barber [45] Sept. 26, 1972

[54] CASSETTE SUPPORT FOR CAMERA ASSEMBLY

[72] Inventor: Walter W. Barber, 31830 Trevor Ave., Hayward, Calif. 94544

[22] Filed: Sept. 16, 1971

[21] Appl. No.: 181,132

[52] U.S. Cl. .................. 95/31 CA, 242/71.1, 352/72
[51] Int. Cl. ...... G03b 1/42, G03b 17/30, G03b 19/04
[58] Field of Search...95/31 R, 31 CA; 352/72, 78 R, 352/78 C; 242/55, 71, 71.1, 197; 274/4 B, 4 C

[56] References Cited

UNITED STATES PATENTS

| 3,627,227 | 12/1971 | Foor | 242/71.7 |
| 3,583,655 | 6/1971 | Roman | 352/72 |
| 3,558,077 | 1/1971 | Heinen | 352/78 R |
| 3,315,910 | 4/1967 | Galley et al | 242/71.1 |
| 3,136,464 | 6/1964 | Schmid | 242/71 |

*Primary Examiner*—Joseph F. Peters, Jr.
*Attorney*—Stephen S. Townsend et al.

[57] ABSTRACT

Structure for supporting a film cassette in the housing of a camera assembly wherein the apparatus includes a flat plate having a pair of opposed edges. The plate has a pair of projections near one of the edges and an aligning member near its opposite edge. The projections are adapted to engage a horizontal base flange on the cassette and the member is disposed in an aligning recess in the bottom of the cassette. The projections prevent rotation of the cassette relative and along the plate as film is removed from the cassette.

10 Claims, 3 Drawing Figures

PATENTED SEP 26 1972

3,693,525

INVENTOR.
WALTER W. BARBER
BY
Townsend and Townsend
ATTORNEYS

CASSETTE SUPPORT FOR CAMERA ASSEMBLY

This invention relates to improvements in industrial camera assemblies of the type having removable film cassettes and, more particularly, to an adapter for mounting a special type of film cassette in such a camera assembly.

In certain types of industrial cameras, the film is supplied in large rolls and the cameras themselves are provided with their own distinctive structures for receiving and holding the film rolls, such as special brackets and the like. Thus, there is no standardization between camera assemblies as to the mounting of the film rolls and a film roll made for use with one camera assembly cannot be used with another and different camera assembly. The user of the camera must, therefore, obtain only film adapted for use in his particular type of camera, a practice which may be expensive under certain circumstances, especially if cheaper and better film is available.

The present invention is directed to a cassette support to adapt a particular type of film cassette to an industrial type camera assembly which is not constructed so as to be used with the cassette. The invention is sufficiently simple and rugged in construction to permit the cassette to be used in several different types of camera assemblies without modification thereto. In this way, the film carried in the cassette can be used notwithstanding the fact that the cassette itself is not constructed for use with that particular camera assembly. The invention, therefore allows some standardization to be achieved in the use of film in cassettes for a number of different types of camera assemblies.

To carry out the teachings of the invention, the cassette support is especially adapted for use with a film cassette having a base flange and a central alignment recess. The support includes a flat plate adapted to be mounted near the film source in a particular camera assembly with the plate having an alignment member receivable within the alignment recess of the cassette. Also, the plate has projection means thereon for engaging the base flange of the cassette to prevent any tendency of the cassette to rock about the plate as film is pulled out of the cassette. The cassette is, therefore, anchored in place at all times with respect to the direction of movement of film out of the same, yet the cassette is readily removable from the support plate when it is to be replaced. The configuration of the plate itself is such that a camera assembly needs substantially no additional space to accommodate the plate. Thus, adapting the camera assembly to a new type of film holder can be quickly and easily made.

The primary object of this invention is to provide an improved support for adapting a film cassette for use with a camera assembly normally requiring another type of film holder so that at least a certain degree of standardization between camera assemblies of different types can be achieved without the need for modifying the same while at the same time certain economies, such as decreased film costs, can be realized.

Another object of this invention is to provide an adapter plate of the purpose described wherein the plate has means for removably mounting a film cassette thereon to prevent rocking of the cassette as film is moved out of the same to thereby stabilize the cassette at all times during use.

Another object of this invention is to provide a cassette and a support therefore wherein the cassette is removably mounted on the support and with the support can be easily secured in place within a camera assembly to permit use of the cassette in the camera assembly without modifying the latter even though the camera assembly is constructed for use with another type of film holder.

Other objects of this invention will become apparent as the following specifications progress, reference being had to the accompanying drawings illustrating an embodiment of the invention.

Figure 1:
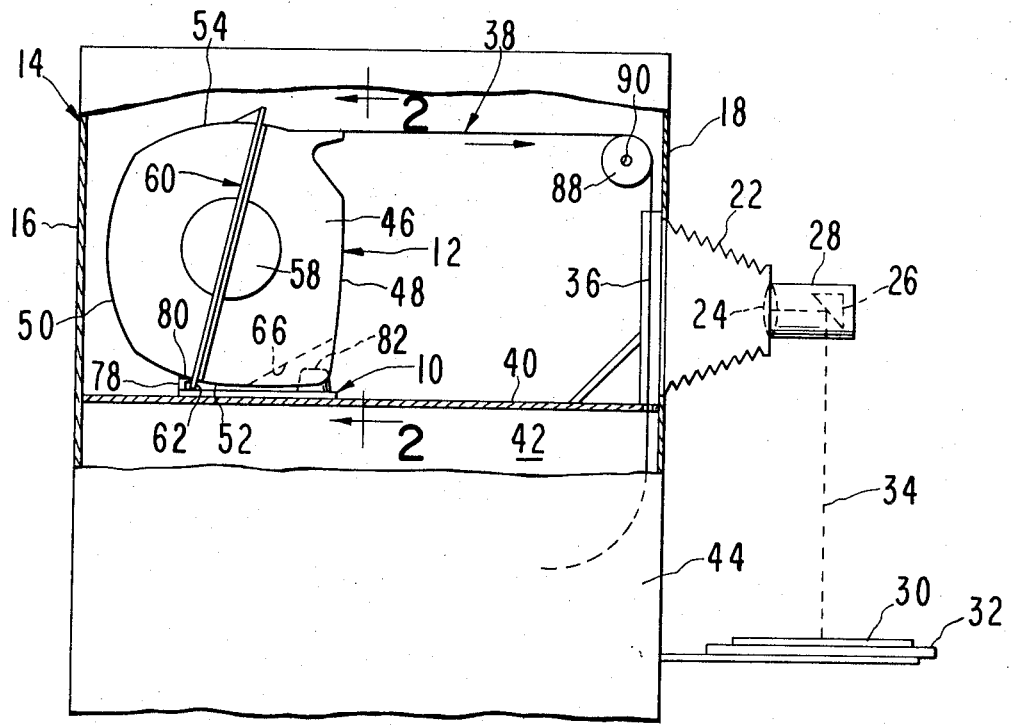
FIG. 1 is a side elevational view, partly broken away, of a camera assembly utilizing the cassette and cassette support of this invention.
Figure 2:
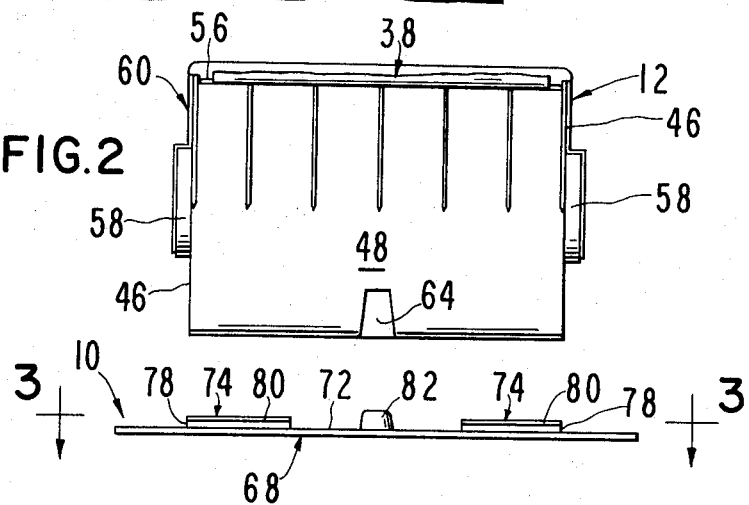
FIG. 2 is a front elevational view of the cassette and cassette support looking in the direction of line 2—2 of FIG. 1 with the cassette being separated from the support.
Figure 3:
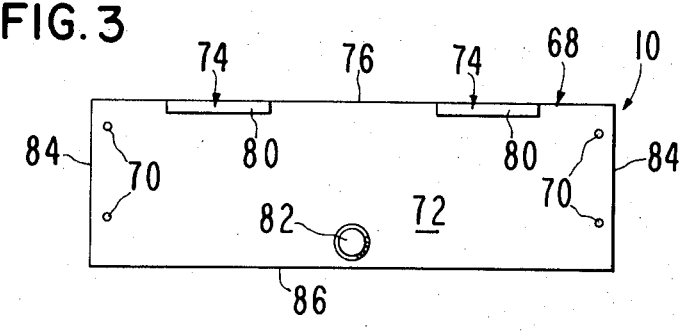
FIG. 3 is a top plan view of the cassette support looking in the direction of line 3—3 of FIG. 2.

The cassette support of this invention is broadly denoted by the numeral 10 and is adapted for use to support a film cassette 12 in a camera assembly 14 having closed housing 16 provided with front and rear walls 18 and 20. Camera assembly 14 is provided with an access door or wall, so that cassette 12 can be placed in and removed from the interior of housing 16. For instance, front wall 18 can be hinged to one side of the housing for opening and closing the front end thereof.

Camera assembly 14 has a bellows 22 coupled with front wall 18 and a camera lens 24 is coupled to the bellows and is aligned with a reflecting prism 26 carried by a sleeve 28 projecting laterally and outwardly from bellows 22. Front wall 18 and sleeve 28 are provided with suitable openings (not shown) and camera assembly 14 has a suitable mechanism (not shown). Thus, an image of a workpiece 30 on a copyboard 32 can be directed along a path 34 to the prism, then toward and through lens 24 and onto a vertical stretch 36 of a photograph film 38 emanating from cassette 12. Film stretch 36 is disposed at the focal plane of lens 24 by suitable structure 37.

Housing 16 also has a bottom 40 below which is an open space 42 in which developing tanks can be disposed so that the film stretch 36, after being exposed, can be directed through the developing tanks and be processed by the developing solutions thereof. A suitable support 44 surrounds space 42 and serves to position camera assembly 14 above a supporting surface. Also, a bracket 45, rigid to support 44, projects laterally therefrom to support copyboard 32 from beneath.

Cassette 12 is of the type manufactured by A. B. Dick Company, Chicago, Ill. and has a pair of opposed side walls 46, a front wall 48, a rear wall 50, a bottom wall 52 and a top wall 54. Top wall 54 has a slit 56 through which film 38 passes as it moves to the right when viewing FIG. 1 out of the cassette. A film roll 57 is rotatably carried in cassette 12 on a hub spanning the distance between side walls 46. Side walls 46 have circular projection 58 which is adapted for use in mounting the cassette in other, special types of camera assemblies.

A generally continuous flange 60 extends about cassette 12 and has a lowermost normally horizontal segment 62 extending across bottom wall 52 and spanning the distance between side walls 46. The lowermost longitudinal edge of flange segment 62 is no lower than the lowermost extremity of bottom wall 52. Front wall 48 of the cassette has an open recess 64 which is triangular in shape as shown in FIG. 1, the long side of the recess defining an inclined surface 66.

Support 10 includes a rigid, rectangular, flat plate 68 of any suitable material, such as aluminum or plastic. Plate 68 has side holes 70 for use in attaching the same by suitable fasteners to bottom 40 of housing 16. Plate 68 has an upper surface 72 and a pair of spaced projections 74 near the rear edge 76 thereof. Each projection 74 has an inverted L-shaped configuration to define a vertical portion 78 rigid to and extending upwardly from face 72 and a horizontal portion 80 extending forwardly from the upper end of portion 78. The overhang of portion 80 defines a recess for receiving at least the lowermost part of flange segment 62 in the manner shown in FIG. 1. Thus, segment 62 can abut portion 80. The thickness of plate 68 is many times less than its length and width. For purposes of illustration, the length, width and thickness of the plate is 15 ⅝ inches, 4 ¾ inches and ¼ inch, respectively.

An alignment member 82 is rigid to and extends upwardly from face 72 of plate 68 midway between the side edges 84 of the plate and near the front edge 86 thereof. Member 82 is cone-shaped and is adapted to be removably received within recess 64 of cassette 12. The configurations and dimensions of the recess and member 82 are such that the member can be press-fitted in recess 64.

In use, plate 68 is secured to bottom 40 of housing 16 by screws or other fasteners passing through holes 70 so that upper face 72 of the plate is generally horizontally disposed. Member 82 will be forwardly of projections 74 as shown in FIG. 1. Cassette 12 is placed on plate 68 and moved rearwardly until flange segment 62 engages the front face of portions 80 of projections 74. As this is being done, the front of the cassette is slightly elevated somewhat from plate 68 and recess 64 is vertically aligned with member 82. When flange segment 62 engages projection 74, the front of the cassette is lowered so that member 82 is caused to enter recess 64 and frictionally engage the side surfaces of the cassette which define the side boundaries of the recess. The cassette is then in the proper position within housing 14 and film 38 can be drawn out of the cassette, about a roller 88 rotatively mounted on a horizontal shaft 90, and then downwardly through the focal plane of lens 24. Successive portions of the film can then be exposed and processed in a well-known manner. When the film supply in cassette 12 has been depleted, the cassette can be removed from housing 14 and replaced by a second cassette.

The present invention is suitable for adapting a film holder of one design to a camera assembly structured to receive a film holder of another design. Thus, the cassette support of this invention renders the camera assembly much more versatile without requiring any modification thereto. It is only necessary to attach plate 68 to bottom 40, the configuration of the plate being such as to require only a minimum of space to accommodate the same. Generally, the size of the housing will be such that ample room is provided for receiving cassette 12 inasmuch as the housing will ordinarily receive a roll of film of the size equivalent to that of the cassette itself.

The construction of support 10 assures that cassette 12 will not be rocked or pivoted forwardly relative to plate 68 as film 38 is drawn out of the cassette. The reason for this is that projections 74 prevent clockwise rotation of the cassette (When viewing FIG. 1) about a horizontal axis across the bottom of the cassette and along front edge 86 as the film is pulled out of the cassette. Flange segment 62 engages projections 74; thus, these projections serve as abutments to prevent such rotational movement yet they allow the cassette to be quickly and easily placed on and taken off plate 68.

Member 82 serves the purpose of aligning the cassette with respect to the lens assembly of the camera so that the film will be properly oriented laterally with respect to the image to be photographically recorded.

In the claims:

1. A support for a film cassette of the type having a central aligning recess comprising: a support plate having a pair of opposed side margins, a pair of opposed end margins, and a pair of opposed faces, said plate being provided with means adjacent to the side margins therefor for mounting the same on a camera assembly with one of the faces being horizontally disposed; means on the plate and insertable in said recess of the cassette for laterally aligning the cassette with respect to the side margins of the plate when the cassette is moved onto said one face; and means engageable with the cassette when the latter is disposed on said one face for preventing rotation of the cassette about a horizontal axis adjacent to said one face and extending longitudinally of one of the end margins of the plate.

2. A support as set forth in claim 1, wherein said faces of the plate are substantially flat and the thickness of the plate is many times less than its length and width.

3. A support as set forth in claim 1, wherein said aligning means includes a projection extending outwardly from said one face near said one end margin, said preventing means including a projection extending outwardly from said one face near the other end margin of the plate.

4. A support as set forth in claim 1, wherein said preventing means includes a pair of spaced projections on one face, each projection having an inverted L-shaped configuration.

5. A support as set forth in claim 1, wherein said aligning means includes a conical, truncated member disposed near said one end margin of the plate substantially midway between the opposed side margins thereof.

6. A support as set forth in claim 1, wherein said preventing means includes a pair of inverted L-shaped projections on said one face symmetrically disposed with respect to said side margins of the plate.

7. In combination: a film cassette having a pair of side walls, a front wall, a bottom wall, a flange extending outwardly from the bottom wall, and an alignment recess at the junction of the front and bottom walls midway between the side walls thereof; and a support plate having a front margin and a flat upper surface and adapted to support the cassette with said bottom wall on the upper surface thereof, said plate having a first projection for insertion into the recess and a second projection for engaging the bottom flange thereof when the cassette is on the plate, said second projection being operable to prevent rotation of the cassette about an axis along the upper surface of the plate longitudinally of the front margin of the plate and through the member when the latter is inserted in the recess and as film is pulled out of the cassette through the slit.

8. The combination as set forth in claim 7, wherein said alignment member is conical and truncated and has a size sufficient to permit it to be press-fitted into the recess.

9. The combination as set forth in claim 7, wherein the second projection includes a pair of spaced elements, each element having an inverted L-shaped configuration.

10. The combination as set forth in claim 9, wherein said plate has a pair of opposed end marginal edges, the alignment member being adjacent to one of the end marginal edges and the pair of projections being adjacent to the other end marginal edge.

* * * * *